Figure 1:
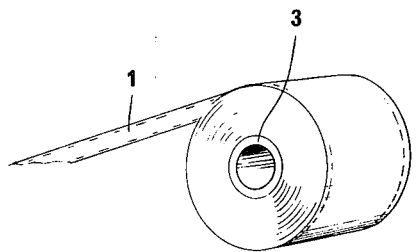

United States Patent [19]
Wallsten

[11] 3,927,464
[45] Dec. 23, 1975

[54] METHOD OF MANUFACTURING MEANS FOR STORING AND TRANSPORTING LIQUIDS, GASES OR FLUIDIZED SOLID PARTICLES UNDER PRESSURE

[75] Inventor: Hans Ivar Wallsten, Saffle, Sweden
[73] Assignee: AB Inventing, Sweden
[22] Filed: Jan. 9, 1974
[21] Appl. No.: 431,882

[30] Foreign Application Priority Data
Feb. 12, 1973 Sweden .............................. 7301929

[52] U.S. Cl. ................. 29/454; 138/119; 138/125; 138/137; 156/93; 156/203; 156/290; 156/294
[51] Int. Cl.² ......................................... B23P 19/04
[58] Field of Search ...... 29/454; 138/118, 119, 123, 138/124, 125, 126, 128, 137, 111, 177, 178; 156/203, 290, 294, 93

[56] References Cited
UNITED STATES PATENTS

| | | | |
|---|---|---|---|
| 31,614 | 3/1861 | Mayall | 138/128 X |
| 1,235,878 | 8/1917 | Cole | 138/137 X |
| 1,863,624 | 6/1932 | Evans | 138/137 X |
| 2,191,374 | 2/1940 | Dixon | 138/119 |
| 2,595,408 | 5/1952 | Quest | 138/128 X |
| 2,912,043 | 11/1959 | Bargholtz | 156/203 X |
| 2,918,394 | 12/1959 | Smith | 138/137 X |
| 2,985,552 | 5/1961 | Watanabe | 138/137 X |

FOREIGN PATENTS OR APPLICATIONS
225,858  5/1958  Australia ............................. 138/119

*Primary Examiner*—Victor A. DiPalma
*Attorney, Agent, or Firm*—Ostrolenk, Faber, Gerb & Soffen

[57] ABSTRACT

A method for manufacturing expandable channel means for storing and transporting liquids, gases or fluidized solid particles under pressure by arranging a pair of thin material sheets in abutting surface relationship and joining the abutting sheets along a pair of opposed edge contours to form a gas-tight channel inner wall network; surrounding the inner wall with a flexible outer wall adapted to expand and limit the inner wall expansion by forming a relatively stiff outer shell strong enough to withstand the pressure prevailing within the channel network defined by the inner wall.

8 Claims, 21 Drawing Figures

U.S. Patent  Dec. 23, 1975  Sheet 1 of 3  3,927,464

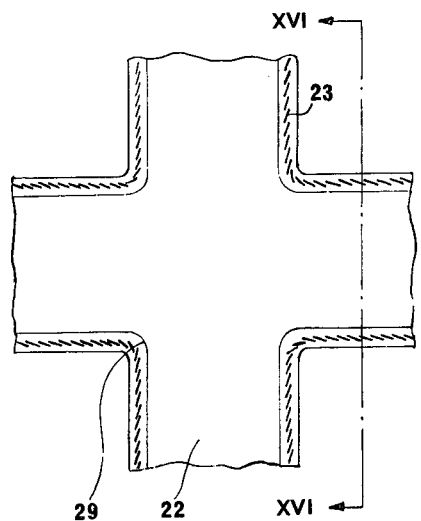
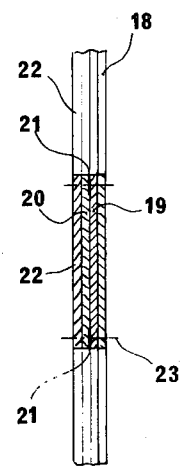
Fig. 15  Fig. 16
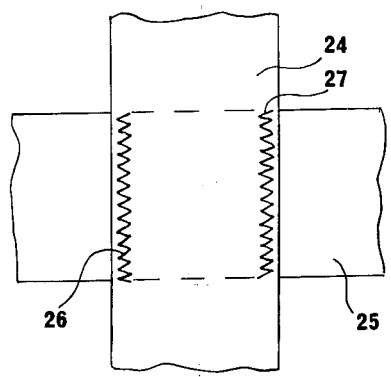
Fig. 17
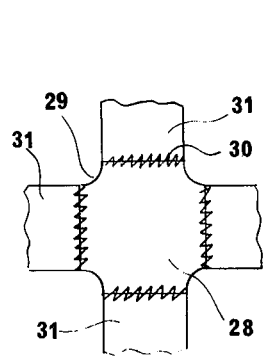 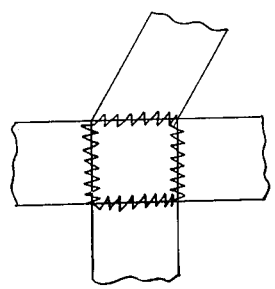 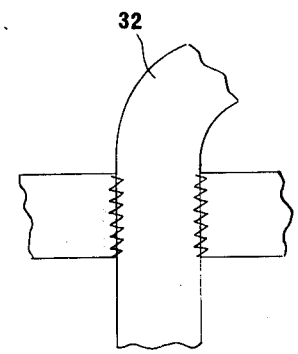
Fig. 18  Fig. 19  Fig. 20

METHOD OF MANUFACTURING MEANS FOR STORING AND TRANSPORTING LIQUIDS, GASES OR FLUIDIZED SOLID PARTICLES UNDER PRESSURE

The present invention relates to a means for storing and/or transporting liquids, gases or fluidized solid particles under pressure and a method of manufacturing such means, the means comprising expansible channels. The invention can be used with advantage for the manufacture of hoses for watering or fire-extinguishing purposes, for compressed air hoses, for the manufacture of de-icing equipment, where a channel system manufactured in accordance with the invention can be arranged at the bottom of a lake or the like, for the manufacture of ventilation tubes for water-purifying plants. The system according to the invention can also with advantage be used for erecting tents, blowing up lifeboats, collision shields for vehicles and many other purposes. For the sake of simplicity the invention will be described in the following primarily with reference to tubular production without, however, being limited thereto.

Tubular means known previously for the transport of liquids and gases, for example, were constructed in such a way that if media under relatively high pressure was to be transported the hoses had naturally to be made of a strong and tight wall material, often consisting of several layers of material joined together. This of course resulted in such means lacking flexibility which is a great drawback particularly if the hoses should be kept rolled up when not in use in order to save space. Hoses of this type, for example for the transport of water or air under pressure, which are manufactured to assume a circular cross-section when in use, tend to retain the circular shape to a certain extent even when in unexpanded state. Thus, when the medium has been emptied out of such a hose, there is some difficulty in rolling it up so that it acquires a flat, tape-shaped cross-section which would be suitable from the storage point of view.

The disadvantages of the known means mentioned above, as well as other drawbacks, have now been eliminated by the solution proposed according to the invention which is substantially characterised by the features defined in the accompanying claims.

The means proposed according to the invention can easily be folded up or rolled when in unexpanded state and therefore takes very little space. Furthermore, the means according to the invention can easily be mass-produced and is therefore relatively inexpensive to manufacture. The means according to the invention may also comprise a complete channel system with branches, which can be manufactured in a single coherent piece. This is a great advantage since it eliminates complicated connections between the main tube and the branch tubes.

Figure 2:
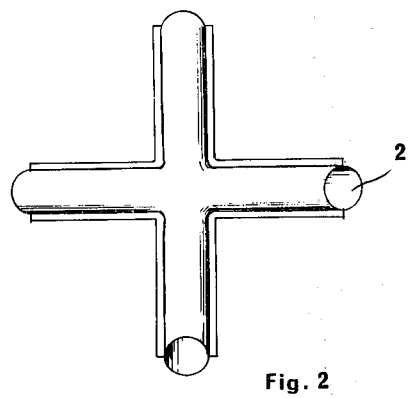
Figure 3:
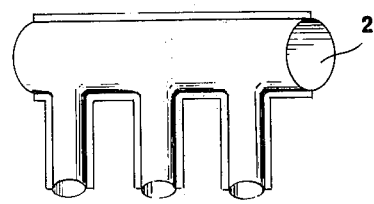
Figure 4:
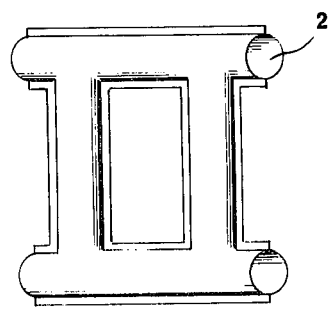
Figure 5:
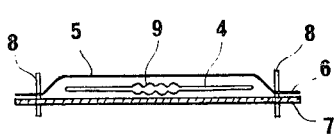
Figure 6:
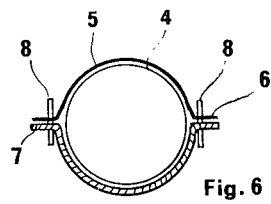
Figure 7:
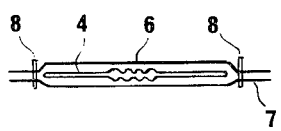
Figure 8:
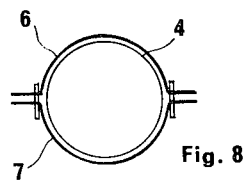
Figure 9:
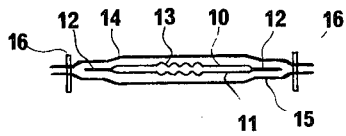
Figure 10:
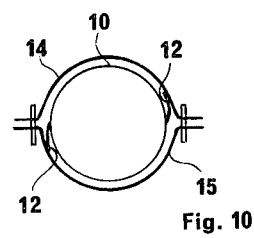
Figure 11:
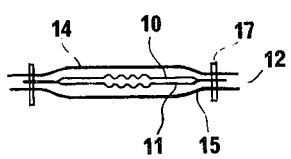
Figure 12:
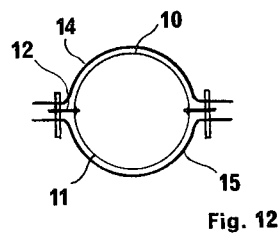
Figure 14:
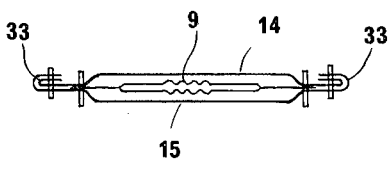
Figure 21:
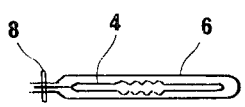
Figure 13:
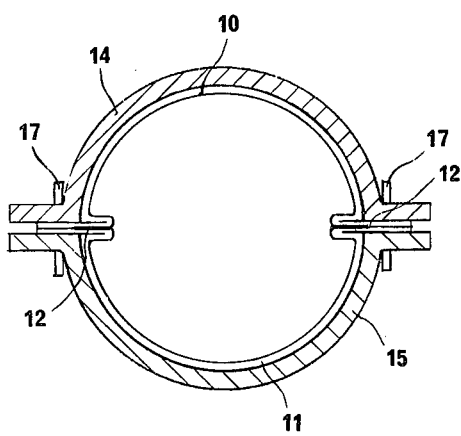

The invention will be further described in the following with reference to some embodiments shown by way of example in the following drawings in which, FIG. 1 shows a hose manufactured in accordance with the invention in flattened and rolled state, FIGS. 2 – 4 show some embodiments of branch tubes constructed in accordance with the invention, FIG. 5 shows a cross-section through a channel manufactured in accordance with the invention in unexpanded state according to a first embodiment, FIG. 6 shows the channel according to FIG. 5 in expanded state, FIG. 7 shows a cross section through an unexpanded channel according to another embodiment, FIG. 8 shows the channel according to FIG. 7 in expanded state, FIG. 9 shows a cross-section through an unexpanded channel according to another embodiment, FIG. 10 shows the channel according to FIG. 9 in expanded state, FIG. 11 shows a cross-section through an unexpanded channel according to another embodiment of the invention, FIGS. 12 and 13 show the channel according to FIG. 11 in expanded state, FIG. 14 shows a cross-section through an unexpanded channel according to yet another embodiment, FIG. 15 shows a flat view of a channel intersection, FIG. 16 shows a section along the line XVI — XVI in FIG. 15, FIGS. 17 – 20 show flat views of various details for the manufacture of channel intersections, FIG. 21 shows a cross-section through an unexpanded channel according to yet another embodiment.

FIG. 1 shows a hose 1 in unexpanded state, rolled up, for carrying water or compressed gas, for example. The hose 1 has been manufactured in accordance with the invention in the manner described in more detail below and consists of a channel 2 which in flattened state, i.e., in the form of a tape, has been coiled up on a reel 3.

FIGS. 2 – 4 show some examples of channel intersections and branch tubes manufactured in accordance with the invention.

FIG. 5 shows a cross-section through one embodiment of a channel 2 constructed in accordance with the invention, and FIG. 6 the same channel in expanded state. An inner space is limited by an inner wall 4 of a gastight, thin, flexible material having greater stretchability when being blown up than an outer wall made of strong, flexible material which surrounds the inner wall 4 on all sides and forms an outer shell 5 consisting in the embodiment shown of an upper part 6 and a lower part 7 with relatively low ductility. Seams joining the upper part 6 to the lower part 7 are designated 8 and the material used for these seams must also have relatively low ductility. In the embodiment shown in FIGS. 5 and 6 the inner wall is not joined to the upper part 6 and lower part 7 of the outer wall. This is an advantage when considering the increased flexibility of the combined materials, which flexibility is increased as the inner and outer walls are movable in relation to each other, even though the inner wall and outer wall may be joined to each other at least in points or zones.

Extensive experiments have shown that it is most suitable if the upper and lower parts 6 and 7 of the outer wall consist of a strong material, for example a woven textile material of nylon or orlon, or of glass fibre or some other synthetic of natural fibre material. By suitable choice of material and weave a strong and flexible outer wall with relatively low ductility can be obtained. In this case the inner wall may suitably consist of a thin plastic material having good flexibility and greater extensibility than that of the outer wall. By extensibility is meant here that the material can easily expand to the intended form due to the forces operating during the expansion since the inner wall has folds, the material having been pleated or stretched, for example, and/or because it is strong enough to permit extension due to plastic and/or elastic deformation. The folds 9, 13 in FIGS. 5, 7, 9, 11 and 14 indicate symbolically that the material has been pleated and/or has good extensibility and can easily be expanded by extension in one or several of the ways just mentioned. The two parts 6, 7 forming the outer wall may in this case suitably be joined by means of a suitable seam using nylon or terylene thread, for example. Seams are suitable for various reasons. They provide satisfactory strength and flexibility and stitching is a quick way of joining the two parts. In certain cases the inner wall should have a ductility of at least 20 percent.

FIG. 6 reveals a cross-section of the channel according to FIG. 5 in expanded state. When liquid or gas is supplied, the thin, gastight inner tube which is not itself dimensioned for the relatively high pressure prevailing, will expand. Since the parts 6, 7 forming the outer wall and the seams 8 are strong enough to withstand the pressure and have relatively little ductility, the combined material which in unexpanded state is flexible and thin, can withstand relatively high gas or liquid pressure without leakage, both during and after expansion, the outer and inner walls forming a relatively stiff tube having substantially circular cross-section. Thus, a channel can be obtained which is extremely flexible and thin in folded state if a suitable plastic material is chosen. For example, it has been found that for hoses for watering purposes, the inner wall may suitable consist of LD polythene in thicknesses of preferably between 20 – 1000 μ. Such material permits relatively great expansion in itself when blown up, but the material may also be pleated so that the resistance will be as low as possible during expansion.

FIGS. 7 and 8 show an embodiment in which the inner wall consists of a material produced in tubular form and where the upper and lower parts of the outer wall consist of the same material.

In the embodiment according to FIG. 9 the inner wall consists of an upper part 10 and a lower part 11 which are sealed in a gas or liquid tight manner along the edges in zones 12, for example by heating. The relatively high ductility is illustrated symbolically by the pleating 13. The outer wall consists of parts 14 and 15 which are joined at 16. FIG. 10 shows this channel in expanded state and it is clear how the sealed edges are pressed against the parts 14 and 15 of the outer wall. It has been found that if the inner wall can easily be stretched, the strain on the sealed edges will be so slight that there is no risk of the seal being broken.

FIG. 11 shows another embodiment in which the parts 14 and 15 of the outer wall have been joined, for example by a seam 17. However, this seam passes through the edges of the inner wall in or outside the zones 12. FIG. 13 illustrates on a larger scale the position taken by the edges sealed in gas or liquid tight manner, when they are forced by the pressure against the outer wall close to where the upper and lower parts have been joined by means of a through-seam 17, for example.

The embodiments according to FIGS. 9 – 13 have certain advantages over the embodiments described earlier. As the inner wall consists of an upper part 10 and a lower part 11 which, being joined in a gas or liquid tight manner, form an inner tube when expanded, a system of connecting channels can easily be manufactured. This s clear from FIGS. 15 and 16 where the lower part of the outer wall is designated 18. 19 and 20 designate the parts intended to form the inner wall, the parts being joined at 21. 22 designates the upper part of the outer wall. Seams for joining the various parts are designated 23 and in FIGS. 15 and 16 these are performed in the same manner as those shown in FIGS. 11 – 13. As can be seen from FIGS. 15 and 16, a connection can easily be effected between two intersecting channels 2 since in this case the parts 19, 20 and 22 consist of cross-linked pieces placed over a similarly cross-linked bottom piece 18.

Another advantage with the embodiments according to FIGS. 9 – 13, 15 and 16 is that since the inner wall consists of two section 10 and 11 joined along the edges in zones as shown in said figures, the channel has a total thickness in unexpanded state, which is only equal to the total material thickness even along the joined edges.

FIG. 17 shows how the blanks forming the channel system according to FIGS. 15 and 16 can easily be manufactured with little waste.

Thus the thin, inner parts 19 and 20 may be made of strips 24, 25 of thermoplastic material, for example, which has been heat-sealed along the stretches 26 and 27 so that it is gas or liquid tight. The parts 18 and 22 can also be manufactured in a corresponding manner, for example a tape of nylon weave being joined by seams.

FIGS. 18 – 20 show some additional designs for blanks for channel sections. FIG. 18 shows an intersection consisting of a piece 28 which may have radii 29, said piece 28 being joined along the lines 30 to strips 31. FIGS. 19 – 20 show other alternative embodiments. In all cases the joints have been indicated schematically by zig-zag lines. The embodiment shown in FIG. 20 has been found suitable for creating curves 32 in the channel system.

In certain cases it has been found advisable for the two open edges formed after sealing of the outer wall to be sealed in suitable manner. FIG. 14 shows an example of how much edge sealing can be effected. In this case the channel corresponds substantially to the embodiment shown in FIG. 11. Here, however, the open edges 33 between the upper and lower parts 14, 15, respectively, of the outer wall have been folded around and then sealed. This prevents particles of dirt or the like from penetrating between the open edges, which is especially advantageous if the channel embodiment shown here is to be used as a watering hose, for example. An outer wall in the form of a circular woven cloth may also be used, in which case the folding of the open edges shown in FIG. 14 is eliminated.

In the embodiment shown in FIG. 21, both the inner wall 4 and the outer wall 6 consist of a strip of material folded in the longitudinal direction, the abutting free edges being joined to each other.

A multitude of different embodiments are feasible within the scope of the invention, only a few of which have been described here. Some examples of suitable material and methods will be given below.

It has been discovered that hoses for watering and fire extinguishing, for example, can be made in accordance with the invention to great advantage. Such hoses can be manufactured to withstand high pressure, while still being easy to roll up in unexpanded state so that they save a great deal of space. This enables considerable lengths of hoses to be kept easily accessible, for example hanging in wall cubicles. The embodiments shown in FIGS. 7, 11, 14 and 21 are particularly suitable for this purpose and the hoses shown here can also be mass-produced using inexpensive material so that, for example, disposable fire hoses can be manufactured according to the invention. This would save considerably in the costs for drying and taking case of the hoses used at present.

It has also proved suitable to use channels or channel systems according to the invention for carrying compressed air, for example. The embodiments shown in FIGS. 2 – 4 having various branch tubes are, for example, suitable for use as compressed air hoses for ventilation during water purification or to prevent the formation of ice on lakes. Extensive channel systems could be used according to the invention, consisting of many branch tubes in which outlets had been arranged to release compressed air. In this way, for example, a considerable area of water can be kept free from ice, such a channel system being anchored at the bottom of the lake and air bubbles being brought to rise to the surface of the water by the air supplied to the channel system bubbling out through openings at suitable points in the system. Hoses with this type of channel system might also be used for supplying various media to chemical processes, for example for supplying air to water purifying plants.

It has also been found suitable to use the channel system produced according to the invention for expanding flexible encasements of various types by supplying pressurized gas to the channel system which is built in to the encasement. The channel system thus becomes stiff and causes the encasement to assume a predetermined configuration. The channel system according to the invention is thus suitable for blowing up lifeboats, tents, collision protection means for vehicles and so on.

Many different materials can be used within the scope of the invention, depending on the application involved. A few examples are given below which have proved suitable for transporting gas or liquids, for example, under pressures of up to 10 kgf/cm² atmospheres overpressure. In these cases it has been found advisable to make the inner wall corresponding to 10 and 11 in FIGS. 9 and 11 of a thin, stretchable plastic material which can be heat-sealed. A suitable material for this purpose is strips of LD polythene or PVC. The inner wall is subjected to considerable strain particularly at intersections such as 29 in FIGS. 15 and 18 and for this reason material having great ductility, for example due to high plasticity and/or elasticity, has been found suitable. It has thus been found that a channel system which is extremely thin and pliable in unexpanded state can be achieved by making the inner wall of strips of a film consisting of a polyolefine, for example polythene, PVC or so-called plastic-rubber (i.e., a copolymerisate of styrene-butadiene or styrene-butadiene-styrene) or a mixture of polythene and ethylene-vinylacetate (EVA) or polythene and plastic-rubber.

In many cases it has been found extremely satisfactory if the inner wall consists of polythene mixed with at least 10 percent plastic-rubber. This material is extremely flexible and stores well. Due to its great ductility the seams 16, 17, for example, in FIGS. 9 and 11 can be sewn at some distance outside the inner edge of the welding zone joining the parts 10 and 11 of the inner wall, which facilitates stitching together parts 14 and 15. The parts 10 and 11 comprising the inner wall, which have been joined by means of heat-sealing, can also be expanded by supplying a pressure medium such as pressurized gas when thay are being fitted together. This produces a gentle and permanent stretching of the inner wall.

The outer wall corresponding to 14, 15 in FIGS. 9 – 14 may, for example in a compressed air hose, consist of a woven cloth or nylon or orlon having a surface weight of between 30 – 800 g/m². The outer wall need not be gas or liquid tight. Within the scope of the invention, of course, the outer wall may consist of several layers of material. Thus, for example, a circularly woven nylon material or a tubular textile material consisting of a multi-layered material may be used.

Of course the parts 10, 11 forming the thermoplastic inner wall can be joined in various ways, such as by means of heat or ultrasound. The parts 10, 11 can be joined before being applied between the parts 14, 15 of the outer wall, to be combined as a unit. In certain cases it is desirable for the distance between the seam 17 (see FIGS. 11 – 14) and the inner edge of zone 12 to be as little as possible since this places less demand on the stretchability of the walls. It has therefore been found suitable for the edge zones 12 to be joined either after or in connection with the seams to join the outer and inner walls. A simple welding tool for thermoplastic sealing may therefore be brought to slide along the seam, possibly being guided by the seam, so that the heat penetrates the material 14, 15 of the outer wall. However, the thermoplastic sealing may also be performed in a separate operation either prior or subsequent to the stitching together of the parts forming the outer wall.

The inner wall can also be made of heatsealable polyurethane having rubber elastic character.

I claim:
1. A method for manufacturing tubular means for storing and transporting liquids, gases and fluidized solid particles under pressure, comprising the steps of:
   a. arranging a pair of thin, flexible, stretchable, liquid tight inner wall sheet portions in abutting surface relationship;
   b. joining the pair of inner wall sheet portions to each other along at least one free edge contour to form a continuous inner wall channel network, the inner wall channels in the unexpanded state having a normally flat cross-section and expandable under internal pressure to have a circular cross-section;
   c. arranging each of a pair of flexible outer wall sheet portions upon each of a pair of opposed outwardly directed surfaces of the normally flat inner wall, the outer wall sheet having a strength relatively greater than the inner wall sheet and sufficient to withstand the expansion pressure within the inner wall channel network; and
   d. joining the pair of outer wall sheet portions to each other along at least one edge contour outwardly positioned beyond the periphery of the inner wall channel network to form a continuous, normally flat outer wall network unattachedly enclosing the inner wall channel network, the outer wall assuming a substantially circular cross-section responsive to the expansion of the enclosed inner wall, thereby limiting the expansion of the inner wall channel network.

2. A method as set forth in claim 1 wherein step (b) is performed by heat-sealing the pair of inner wall sheet portions together along the at least one edge contour.

3. A method as set forth in claim 1, wherein step (b) is performed by sewing the pair of inner wall sheet portions together along the at least one edge contour.

4. A method as set forth in claim 1, wherein step (a) further includes the step of folding a strip of inner wall material in the longitudinal direction to form a U-shaped channel having a pair of generally parallel free arms forming a pair of inner wall sheet portions.

5. A method as set forth in claim 1, wherein step (a) further includes the step of forming each inner wall sheet portion from a separate one of a pair of material strips; and step (b) further includes the step of joining the pair of separate inner wall sheets to each other along a pair of opposed edge contours.

6. A method for manufacturing a branched network of tubular means for storing and transporting liquids, gases and fluidized solid particles under pressure, comprising the steps of:
   a. cutting a first pair of thin, flexible, stretchable, liquid tight sheets of material to a predetermined branched network shape;
   b. arranging both material sheets in abutting surface relationship one upon the other;
   c. cutting a second pair of flexible material sheets to have the same predetermined branched network shape;
   d. arranging each of the second pair of flexible sheets upon an opposed outwardly directed surface of the overlaid first pair of cut sheets;
   e. joining the first pair of overlaid sheets along a pair of opposed edge contours to form a normally flat continuous branched inner wall channel network; and
   f. joining the second pair of material sheets to each other along a pair of opposed edge contours outwardly positioned beyond the inner wall edge contours to form a normally flat branched continuous outer wall network unattachedly enclosing the inner wall branched network, the inner branched channel network in the unexpanded state being normally flat and assuming a substantially circular cross-section responsive to internal pressure, the outer wall material having a strength sufficient to withstand the pressure within the inner wall branched channel network to form a relatively stiff branched outer shell having a substantially circular crosssection limiting the inner wall branched channel network expansion under pressure.

7. A method as set forth in claim 6, wherein the step of joining the pair of inner wall sheets is performed in a separate operation before the step of joining the pair of outer wall sheets.

8. A method as set forth in claim 6, wherein steps (d) and (e) further include the step of continuously heat-sealing the opposed edge contours of the inner wall pair of sheets along their entire length simultaneous with the step of joining the pair of outer wall material sheets.

* * * * *